(12) United States Patent
Beer et al.

(10) Patent No.: US 10,287,912 B2
(45) Date of Patent: May 14, 2019

(54) BEARING RING AND LAYER BY LAYER METHOD FOR MANUFACTURING A BEARING RING

(71) Applicant: Schaeffler Technologies AG & Co. KG, Herzogenaurach (DE)

(72) Inventors: Oskar Beer, Schweinfurt (DE); Peter Gloeckner, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/503,961

(22) PCT Filed: Jul. 27, 2015

(86) PCT No.: PCT/DE2015/200424
§ 371 (c)(1),
(2) Date: Feb. 14, 2017

(87) PCT Pub. No.: WO2016/026490
PCT Pub. Date: Feb. 25, 2016

(65) Prior Publication Data
US 2017/0276022 A1    Sep. 28, 2017

(30) Foreign Application Priority Data

Aug. 18, 2014 (DE) .......... 10 2014 216 313

(51) Int. Cl.
*F16C 33/58* (2006.01)
*F01D 25/12* (2006.01)
(Continued)

(52) U.S. Cl.
CPC .......... *F01D 25/125* (2013.01); *B22F 3/1055* (2013.01); *B22F 3/24* (2013.01); *B22F 5/10* (2013.01); *C22C 33/0271* (2013.01); *F01D 25/186* (2013.01); *F16C 33/581* (2013.01); *F16C 33/583* (2013.01); *F16C 33/62* (2013.01); *F16C 33/64* (2013.01); *F16C 37/007* (2013.01); *B22F 2999/00* (2013.01); *F16C 19/06* (2013.01); *F16C 33/60* (2013.01); *F16C 33/6659* (2013.01); *F16C 2220/00* (2013.01);
(Continued)

(58) Field of Classification Search
CPC ....................................................... F16C 37/007
USPC ................................................... 384/476, 467
See application file for complete search history.

(56) References Cited

U.S. PATENT DOCUMENTS 3,480,342 A * 11/1969 Venable .................. F16C 33/32
                                                                384/476
3,504,955 A *  4/1970 Bailey ..................... F16C 27/04
                                                                384/535
(Continued)

FOREIGN PATENT DOCUMENTS

DE        3022227        12/1981
DE        32 17 892      11/1983
(Continued)

OTHER PUBLICATIONS

International Search Report dated Nov. 13, 2015, 2 pages.

*Primary Examiner* — Thomas R Hannon
(74) *Attorney, Agent, or Firm* — Davidson, Davidson & Kappel, LLC

(57) ABSTRACT

A bearing ring with integrated cooling channels and a method for producing a bearing ring with integrated cooling channels are provided.

15 Claims, 2 Drawing Sheets

(51) Int. Cl.
*B22F 3/105* (2006.01)
*F01D 25/18* (2006.01)
*F16C 37/00* (2006.01)
*F16C 33/64* (2006.01)
*B22F 3/24* (2006.01)
*B22F 5/10* (2006.01)
*C22C 33/02* (2006.01)
*F16C 33/62* (2006.01)
*F16C 19/06* (2006.01)
*F16C 33/60* (2006.01)
*F16C 33/66* (2006.01)

(52) U.S. Cl.
CPC ......... *F16C 2360/23* (2013.01); *Y02P 10/295* (2015.11); *Y02T 50/672* (2013.01); *Y02T 50/675* (2013.01)

(56) References Cited

U.S. PATENT DOCUMENTS

| | | | | |
|---|---|---|---|---|
| 3,620,586 | A * | 11/1971 | Maastricht | B23Q 1/70 384/476 |
| 3,853,309 | A * | 12/1974 | Widmer | B22D 19/0072 164/98 |
| 4,032,198 | A * | 6/1977 | Hamburg | F16C 19/26 184/104.1 |
| 4,272,134 | A | 6/1981 | Levefelt | |
| 4,428,628 | A * | 1/1984 | Brown | F16C 19/28 384/467 |
| 4,458,959 | A | 7/1984 | Roeling | |
| 5,915,843 | A * | 6/1999 | Mattera | B22D 11/1287 384/316 |
| 8,479,396 | B2 | 7/2013 | Streit et al. | |
| 8,616,778 | B2 | 12/2013 | Takahashi | |
| 8,827,564 | B2 | 9/2014 | Hamada et al. | |
| 8,979,971 | B2 | 3/2015 | Schuster | |
| 9,068,593 | B2 * | 6/2015 | Gloeckner | F16C 27/045 |
| 9,206,841 | B2 | 12/2015 | Cordier et al. | |
| 9,234,548 | B2 | 1/2016 | Frank | |
| 2003/0147765 | A1 | 8/2003 | Schlipf et al. | |
| 2011/0268381 | A1* | 11/2011 | Hamada | F16C 19/52 384/569 |

FOREIGN PATENT DOCUMENTS

| | | |
|---|---|---|
| DE | 102006025008 | 12/2007 |
| DE | 102010022315 | 12/2011 |
| DE | 102011005925 | 9/2012 |
| DE | 102011101857 | 11/2012 |
| DE | 112011105249 | 2/2014 |
| EP | 1998023 | 12/2008 |
| EP | 2 503 107 B1 | 9/2012 |
| EP | 2503107 | 5/2014 |
| GB | 2121118 | 12/1983 |
| JP | 02190618 A * | 7/1990 ........... F16C 37/007 |
| JP | 2002139061 | 5/2002 |
| WO | WO2013179017 | 12/2013 |

* cited by examiner

BEARING RING AND LAYER BY LAYER METHOD FOR MANUFACTURING A BEARING RING

The present invention relates to a bearing ring including integrated cooling channels and to a method for manufacturing a bearing ring including integrated cooling channels.

BACKGROUND

Bearing rings in aircraft engines are generally exposed to high rollover loads and high operating temperatures. This applies in particular for bearing rings in bearing systems for main shafts. The materials used for such bearing rings are predominantly heat-resistant, fully hardened or case-hardened steels, such as, for example, M50 (AMS 6491), M50NiL (AMS 6278), RBD, Pyrowear 675 (AMS 5930).

The heat dissipation from the contact areas takes place with the aid of a continuous oil flow. In this case, an improved heat dissipation from the contact area may effectuate an increase in the performance of bearings, for example, in the engine area. A heat dissipation approach is known, for example, from EP 2 503 107 B1 which describes a bearing system for a turbomachine, one bearing housing part being provided with a coolant channel and one bearing housing part being provided with a lubricant channel, the coolant channel and the lubricant channel being fluidically separated from one another. Specifically, a material composite structure made of a bearing housing including integrated cooling channels in combination with a bearing shell is described.

Since the fatigue strength of the aforementioned heat-resistant steels decreases as the temperature increases, however, and the operating temperature, below which the oils used for lubrication and heat dissipation may be used, is limited, a higher temperature in the contact area may not be permitted with the presently utilized bearing materials and oils.

In principle, a heat dissipation from the contact area is also possible, for example, in EP 2 503 107 B1. The cooling capability is limited, however, since the channels through which coolant flows are relatively far removed from the contact surface, since the bearing shell must have a certain minimum thickness, for reasons of strength. Moreover, the manufacture of the described composite structure is problematic. In addition, due to the introduction of the cooling channels on the inner diameter of the inner ring or on the outer diameter of the outer ring, the fit conditions present there, for example in terms of strength and a different expansion of the partners in the fit, are influenced.

SUMMARY OF THE INVENTION

It is an object of the present invention to provide bearing rings and a method for their manufacture, where an effective heat dissipation from the contact area is possible.

The bearing ring according to the present invention includes, in this case, integrated internal cooling channels which have a cross section which deviates from a circular shape. In this case, the cross section may be designed similarly to a curved oblong hole, a triangle, a semicircle, a circular ring segment, or a polygon.

It is particularly preferred when a cross section extends arcuately in a shape similar to that of the raceway to be cooled, i.e., basically conforms to or is adapted to the shape of the raceway. Due to this shape, the heat transfer between the cooling channel and the raceway increases. As a result, the strength of the utilized bearing also necessarily improves in terms of speed, load capacity, and temperature range.

A more compact construction is likewise possible: in principle, a more compact construction, under the same external load, results in greater surface pressures at the rolling contacts. Associated therewith are greater power losses at the rolling contacts and, therefore, higher thermal stresses on the bearing components. With the aid of the present invention, these higher temperatures may be compensated for or even reduced, on the one hand, with the aid of the oil flow in the cooling channels which are proximate to the raceway and have a nestled cross-sectional shape. On the other hand, due to the introduction of the cooling channels proximate to the raceway and the optimized cross-sectional shape, a greater heat flow may be transported away than is possible by situating the cooling channels in the bearing-seat diameter. Conversely, this means that less cooling liquid is required, i.e., a lower volume flow of oil and a smaller heat exchange surface are needed, i.e., a smaller cross-sectional area of the channel or a shorter cooling channel.

In yet another preferred specific embodiment, the channel cross section may vary along the course of the channel in terms of shape and surface measure, whereby the heat exchange surface, the heat transfer coefficient, and the flow velocity of the coolant may be influenced. This targeted influencing of the heat transfer in the circumferential direction may advantageously affect the dissipation of the power losses in the circumferential direction in the load zone which is pronounced in radially loaded rolling bearings. In addition, particular requirements on the structural strength of the rings may be taken into account with the aid of cross-sectional shapes and surface measures which are modifiable in the circumferential direction.

According to a method of the present invention, cooling channels are introduced in the direct proximity of the contact zone, or the running surface of the bearing ring, in such a way that these cooling channels are directly integrated into the material which forms the raceway.

Therefore, an effective removal of heat from the contact area is possible with the aid of channels, through which oil flows, and which are located proximate to the contact zones of the bearing rings. An introduction of cooling channels into this area is not possible using the previously applied manufacturing methods. According to the present invention, it is therefore provided to form the cooling channels during the formation of the bearing rings, preferably using a generative manufacturing method, such as, for example, laser melting, laser sintering, or the like.

This method according to the present prior art is not applicable, however, using the fully hardened steels which are required for the extreme intended purposes in aircraft engines, for example, since great distortion and cracks may form during the generative manufacturing process.

According to the present invention, it is therefore provided to use a powder of a low-carbon-containing steel for the generative manufacturing method. The hardness necessary in the area of the raceways may then be achieved with the aid of a subsequent surface hardening, for example, by a subsequent enrichment with carbon.

DETAILED DESCRIPTION

Figure 1:
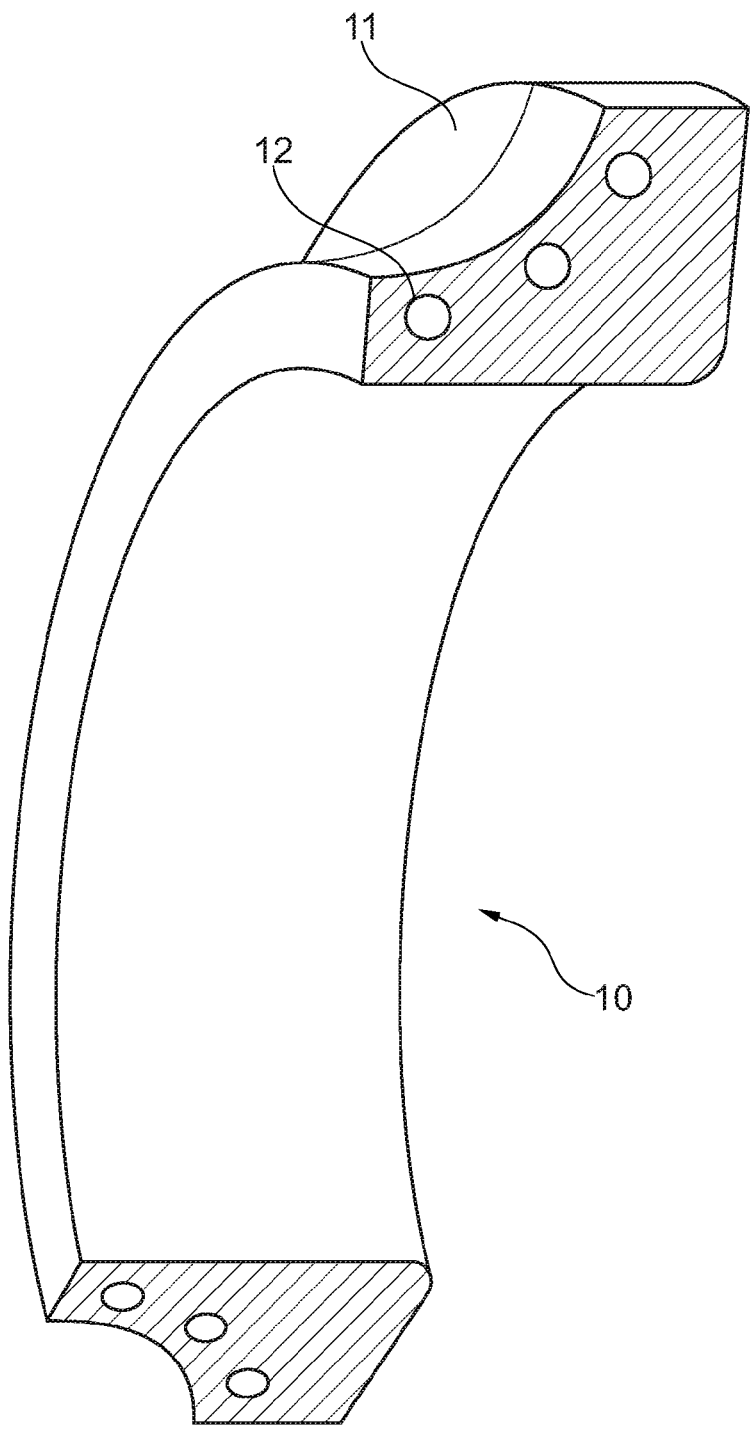
FIG. 1 shows a cross section of a bearing.

FIG. 1 shows a cross section of a bearing ring 10 according to the present invention, including channels 12 introduced along raceway 11.

Figure 2:
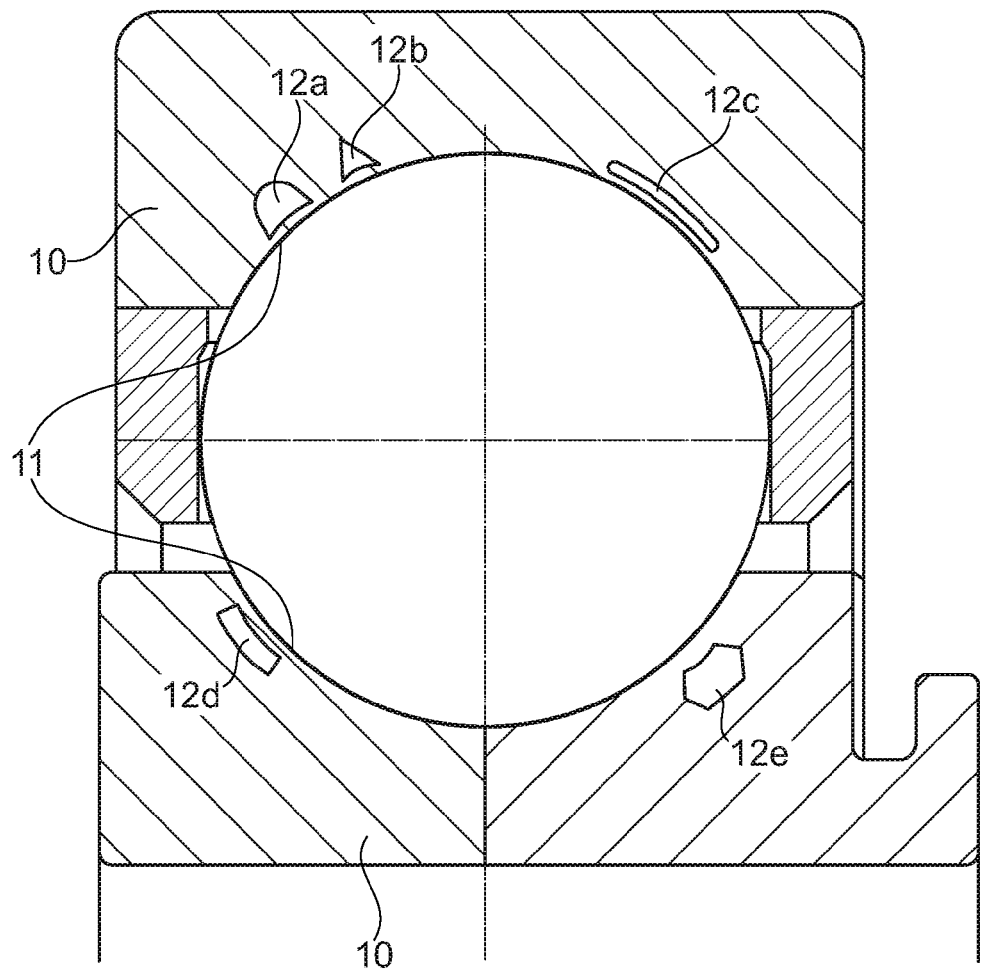
FIG. 2 shows a cross section of a bearing including bearing rings.

FIG. 2 shows a cross section of a bearing including bearing rings 10 according to the present invention. Various channels 12a, 12b, 12c, 12d, 12e having various cross-sectional shapes are apparent along the raceways 11.

The invention claimed is:

1. A bearing ring comprising:
   a material forming an arcuate raceway; and
   at least one interior channel integrated directly into the material forming the arcuate raceway, the at least one channel having a cross-sectional shape deviating from a circular shape.

2. The bearing ring as recited in claim 1 where the cross-sectional shape of the at least one channel changes along a course of the channel.

3. The bearing ring as recited in claim 1 wherein the material is formed of a low-carbon containing steel with the raceway enriched with carbon.

4. The bearing ring as recited in claim 1 wherein the cross-sectional shape is a curved oblong hole.

5. The bearing ring as recited in claim 1 wherein the cross-sectional shape is a triangle.

6. The bearing ring as recited in claim 1 wherein the cross-sectional shape is a semicircle.

7. The bearing ring as recited in claim 1 wherein the cross-sectional shape is a circular ring segment.

8. The bearing ring as recited in claim 1 wherein the cross-sectional shape is a polygon.

9. The bearing ring as recited in claim 1 wherein the cross-sectional shape of the channel conforms to a shape of the raceway.

10. A method for manufacturing the bearing ring as recited in claim 1 comprising:
    providing the material forming the arcuate raceway; and
    forming the at least one channel in the material forming the arcuate raceway, the at least one channel including a plurality of channels having a cross-sectional shape deviating from a circular shape.

11. The method as recited in claim 10 wherein the forming of the bearing ring includes forming the plurality of channels to have a cross-sectional shape changing along a course of the channels.

12. The method as recited in claim 10 wherein providing of the material forming an arcuate raceway includes using a powder of a low-carbon-containing steel.

13. The method as recited in claim 12 wherein the forming of the at least one channel in the material forming the arcuate raceway is performed using a generating manufacturing method.

14. The method as recited in claim 13 wherein the generating manufacturing method is laser melting or laser sintering.

15. The method as recited in claim 13 further comprising enriching the raceway with carbon.

\* \* \* \* \*